United States Patent
Paz et al.

(10) Patent No.: US 12,149,315 B2
(45) Date of Patent: Nov. 19, 2024

(54) CHANNEL STATE FEEDBACK CONSISTENT WITH CODE BLOCK MAPPING ASSUMPTION

(71) Applicant: QUALCOMM Incorporated, San Diego, CA (US)

(72) Inventors: Daniel Paz, Geva Carmel (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/580,986

(22) Filed: Jan. 21, 2022

(65) Prior Publication Data
US 2023/0239024 A1    Jul. 27, 2023

(51) Int. Cl.
*H04B 7/06* (2006.01)
*H04L 5/00* (2006.01)
*H04W 72/0446* (2023.01)
*H04W 72/23* (2023.01)

(52) U.S. Cl.
CPC ......... *H04B 7/0626* (2013.01); *H04L 5/0048* (2013.01); *H04W 72/0446* (2013.01); *H04W 72/23* (2023.01)

(58) Field of Classification Search
CPC ..... H04L 5/0048; H04W 72/23; H04B 7/0626
See application file for complete search history.

(56) References Cited

U.S. PATENT DOCUMENTS

| | | | |
|---|---|---|---|
| 2013/0343300 A1* | 12/2013 | Kim ............... | H04L 5/0035 370/329 |
| 2015/0318908 A1* | 11/2015 | Ko ................. | H04B 7/0456 375/267 |
| 2017/0111098 A1* | 4/2017 | Kim ............... | H04B 7/0632 |
| 2020/0052761 A1* | 2/2020 | Nammi ........... | H04B 7/0486 |

* cited by examiner

*Primary Examiner* — Brenda H Pham
(74) *Attorney, Agent, or Firm* — Arent Fox, LLP

(57) ABSTRACT

In a wireless communication system, dynamic changes of a code block (CB) to resource element (RE) mapping type may improve decoding performance in some scenarios. Dynamic CB mapping may impact calculation of channel state information (CSI) metrics. A base station may transmit a physical downlink shared channel (PDSCH) based on a first dynamic CB mapping type in one or more slots. The base station may transmit a CSI reference signal (CSI-RS). A UE may receive the PDSCH and CSI-RS and calculate a channel quality indicator (CQI) and rank indicator (RI) based on the CRS assuming a second dynamic CB mapping type. The UE may transmit a CSI report including the CQI and the RI to the base station, which may assume the same second dynamic CB mapping type for the CQI and the RI.

30 Claims, 12 Drawing Sheets

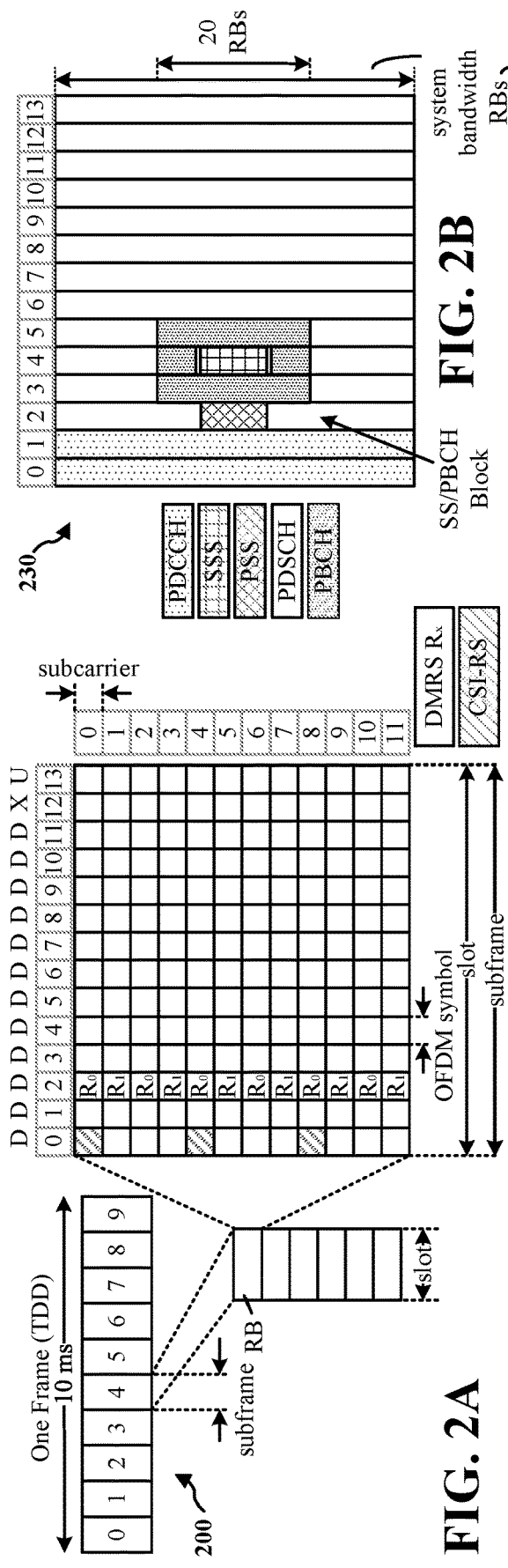
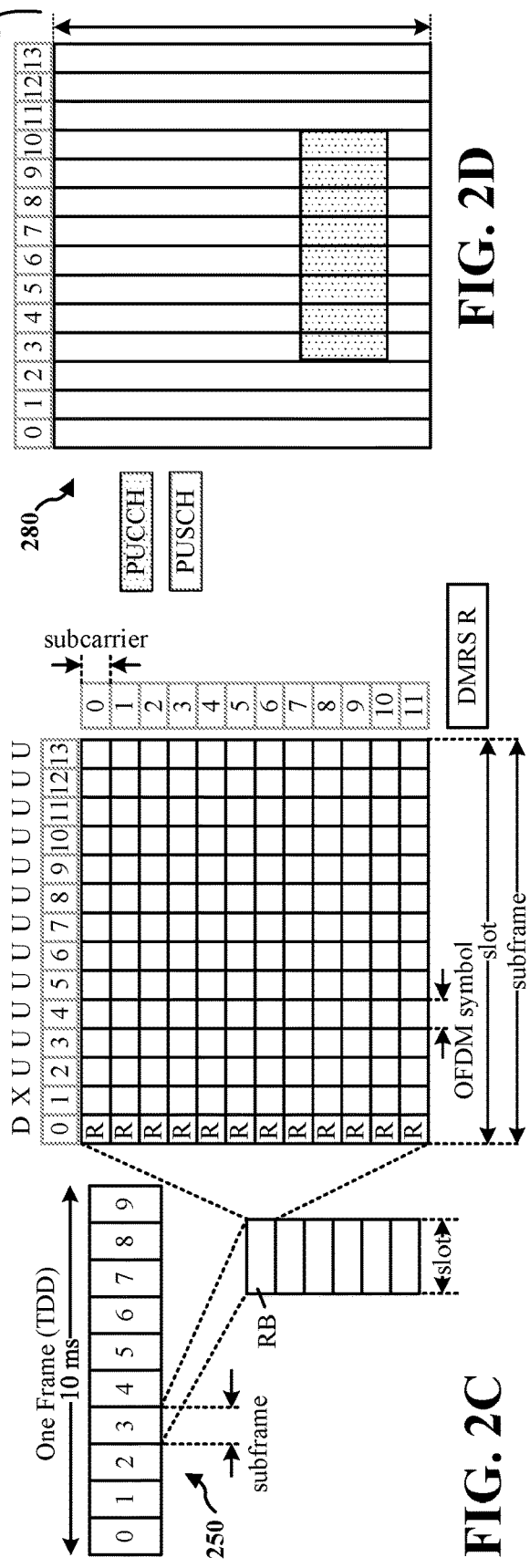

CHANNEL STATE FEEDBACK CONSISTENT WITH CODE BLOCK MAPPING ASSUMPTION

BACKGROUND

Technical Field

The present disclosure relates generally to communication systems, and more particularly, to channel state feedback (CSF) consistent with a code block mapping assumption.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus for a user equipment (UE) are provided. The method includes receiving a physical downlink shared channel (PDSCH) based on a first dynamic code block (CB) mapping type in one or more slots. The method may include calculating a channel quality indicator (CQI) and rank indicator (RI) based on a channel state information reference signal (CSI-RS) assuming a second dynamic code block mapping type. The method includes transmitting a channel state information (CSI) report including the CQI and the RI.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

In another aspect, the disclosure provides a method, a non-transitory computer-readable medium, and an apparatus for a base station. The method includes transmitting a PDSCH based on a first dynamic CB mapping type in one or more slots. The method includes transmitting a CSI-RS. The method includes receiving a CSI report including a CQI and a RI based on the CSI-RS assuming a second dynamic code block mapping type.

The present disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with certain aspects of the present description.

FIG. 2B is a diagram illustrating an example of downlink (DL) channels within a subframe, in accordance with certain aspects of the present description.

FIG. 2C is a diagram illustrating an example of a second frame, in accordance with certain aspects of the present description.

FIG. 2D is a diagram illustrating an example of uplink (UL) channels within a subframe, in accordance with certain aspects of the present description.

DETAILED DESCRIPTION

Figure 1:
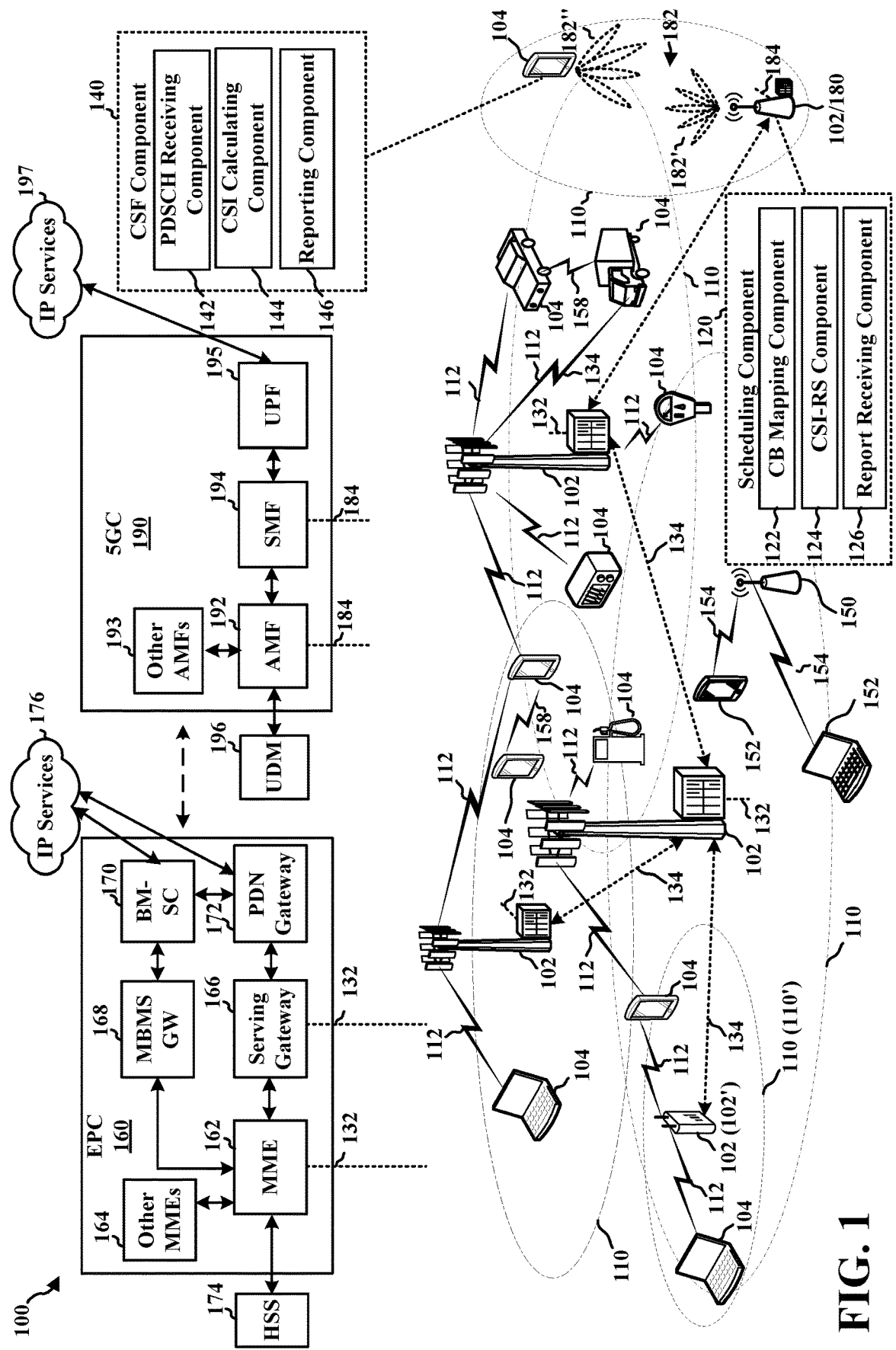
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Conventional 5G NR systems utilize a frequency first mapping of code blocks (CBs) to resource elements (REs). That is, bits of a CB may be sequentially allocated to REs in order of the RE index. Where a transmission includes multiple layers, the frequency first mapping allocates bits of the CB across the multiple layers at an RE index, then moves to the next RE index. Other mapping types for CB to RE mapping may perform better than a frequency first mapping in some scenarios. Other mapping types include a time first, frequency first per layer, and time first per layer, for example. For instance, a time first mapping may provide better performance than a frequency first mapping for high mobility scenarios (e.g., 120 kilometers per hour) with relatively high signal to noise ratio (SNR) (e.g., above 20 dB). As another example, frequency first per layer mapping may provide better performance than frequency first mapping in low mobility scenarios with high SNR. Dynamic selection of a mapping type may improve performance at a UE.

One issue with dynamic selection of mapping type is coordination between the base station and UE regarding the mapping type for a transmission. Selection of a mapping type and scheduling of the transmission may be further complicated by channel state feedback (CSF). Conventionally, a UE transmits a channel state information (CSI) report that includes a channel quality indicator (CQI) and rank indicator (RI) that are based on estimated decoding performance of the UE. The base station may then use the CQI and RI to schedule physical downlink shared channel (PDSCH) transmissions with a modulation and coding scheme (MCS) and rank that the UE is likely to be able to decode. The decoding performance, however, may depend on the CB to RE mapping type. Accordingly, the base station and the UE may need to coordinate not only the CB to RE mapping type used for a transmission (e.g., the PDSCH), but also a CB to RE mapping type assumed for estimation of CSI such as CQI and RI. Thus, in addition to the conventional definitions and assumptions for CSF evaluation, a CB mapping type should be considered for CQI and RI evaluation as well. If a CB mapping type assumption/configuration is used for CSF evaluation, additional definitions may maintain CSF consistency with CB mapping adaptation process and also for an aligned assumption on the UE and BS sides regarding CB mapping option considered for CSF evaluation.

In an aspect, the present disclosure provides for calculation and reporting of CSI including CQI and RI based on a commonly assumed dynamic CB mapping type, which may be different than a dynamic CB mapping type of a recent PDSCH. The commonly assumed dynamic CB mapping type may be based on definitions or rules, which may depend on a signaling mechanism for the dynamic CB mapping type for PDSCH. In particular, the dynamic CB mapping type for PDSCH may be signaled via either a downlink control information (DCI) or a media access control (MAC) control element (CE). In each case, the dynamic CB mapping type for PDSCH may change during a time period including PDSCH slots, a CSI reference resource slot, and a CSI reference signal (CSI-RS) slot associated with a CSI report. Accordingly, the rules and definitions for the commonly assumed dynamic CB mapping type may allow the UE and base station to unambiguously operate on the same assumption regarding a CSI and RI.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

One or more of the UEs 104 may include a channel state feedback (CSF) component 140 that measures and reports CSI including a CQI and RI based on a commonly assumed dynamic CB mapping type. The CSF component 140 may include a PDSCH receiving component 142 configured to receive a physical downlink shared channel (PDSCH) based on a first dynamic CB mapping type in one or more slots. The CSF component 140 may include a CSI calculating component 144 configured to calculate a channel quality indicator (CQI) and rank indicator (RI) based on a channel state information reference signal (CSI-RS) assuming a second dynamic CB mapping type (e.g., the commonly assumed dynamic CB mapping type). The CSF component 140 may include a reporting component 146 configured to transmit a channel state information (CSI) report including the CQI and the RI.

In an aspect, one or more of the base stations 102 may include a scheduling component 120 that performs the actions of the base station as described herein (e.g., scheduling the PDSCH for the UE based on the CQI and RI according to the commonly assumed dynamic CB mapping type). For example, the scheduling component 120 may include a CB mapping component 122 configured to transmit a physical downlink shared channel (PDSCH) based on a first dynamic CB mapping type in one or more slots. The scheduling component 120 may include a CSI-RS component 124 configured to transmit a channel state information reference signal (CSI-RS). The scheduling component 120 may optionally include a report receiving component 126 configured to receive a channel state information (CSI) report including a channel quality indicator (CQI) and rank indicator (RI) based on the CSI-RS assuming a second dynamic CB mapping type.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., 51 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D are resource diagrams illustrating example frame structures and channels that may be used for uplink, downlink, and sidelink transmissions to a UE 104 including a CSF component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
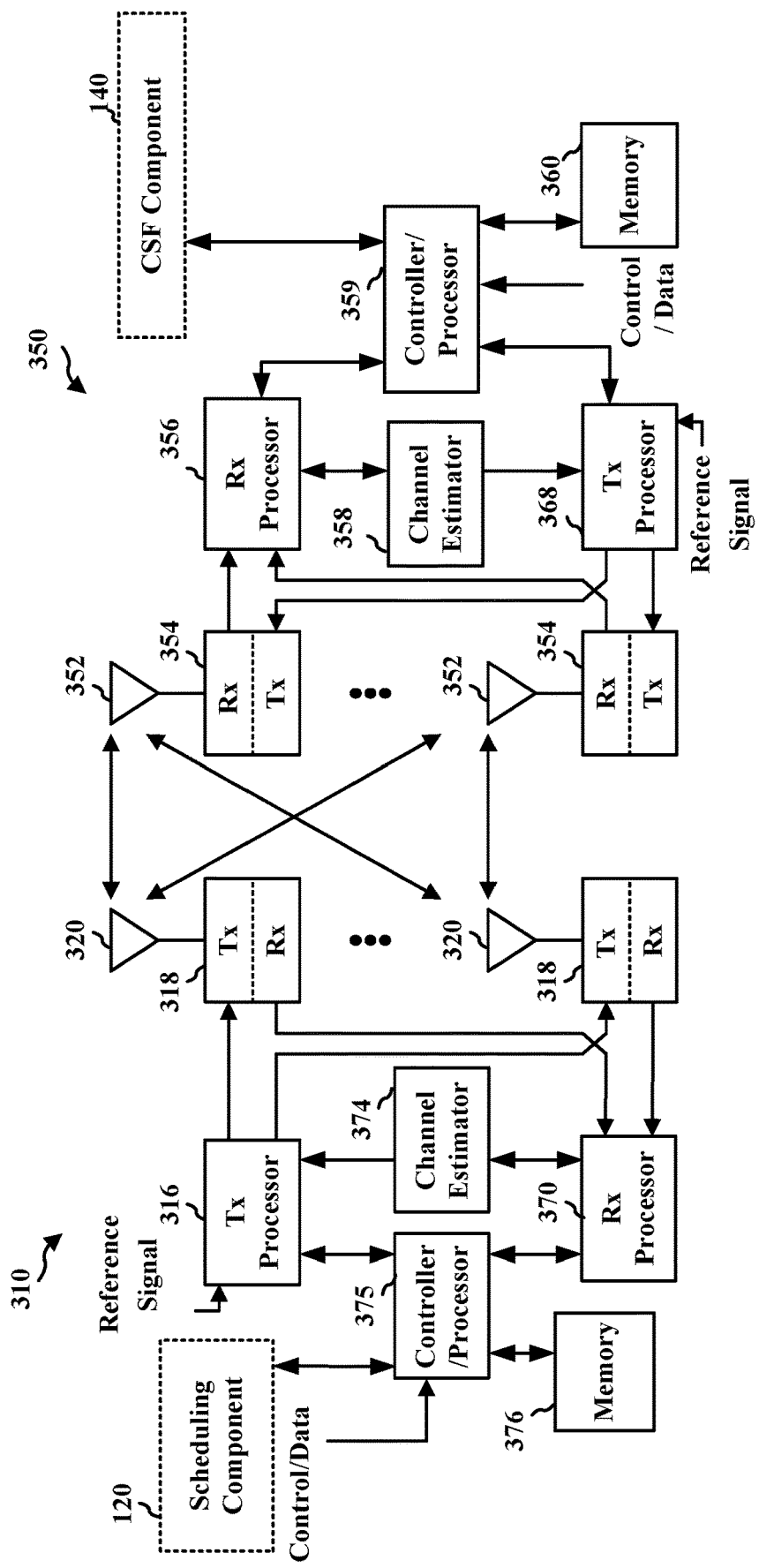
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the CSF component 140 of FIG. 1.

At least one of the Tx processor 316, the Rx processor 370, and the controller/processor 375 may be configured to perform aspects in connection with the scheduling component 120 of FIG. 1.

Figure 4:
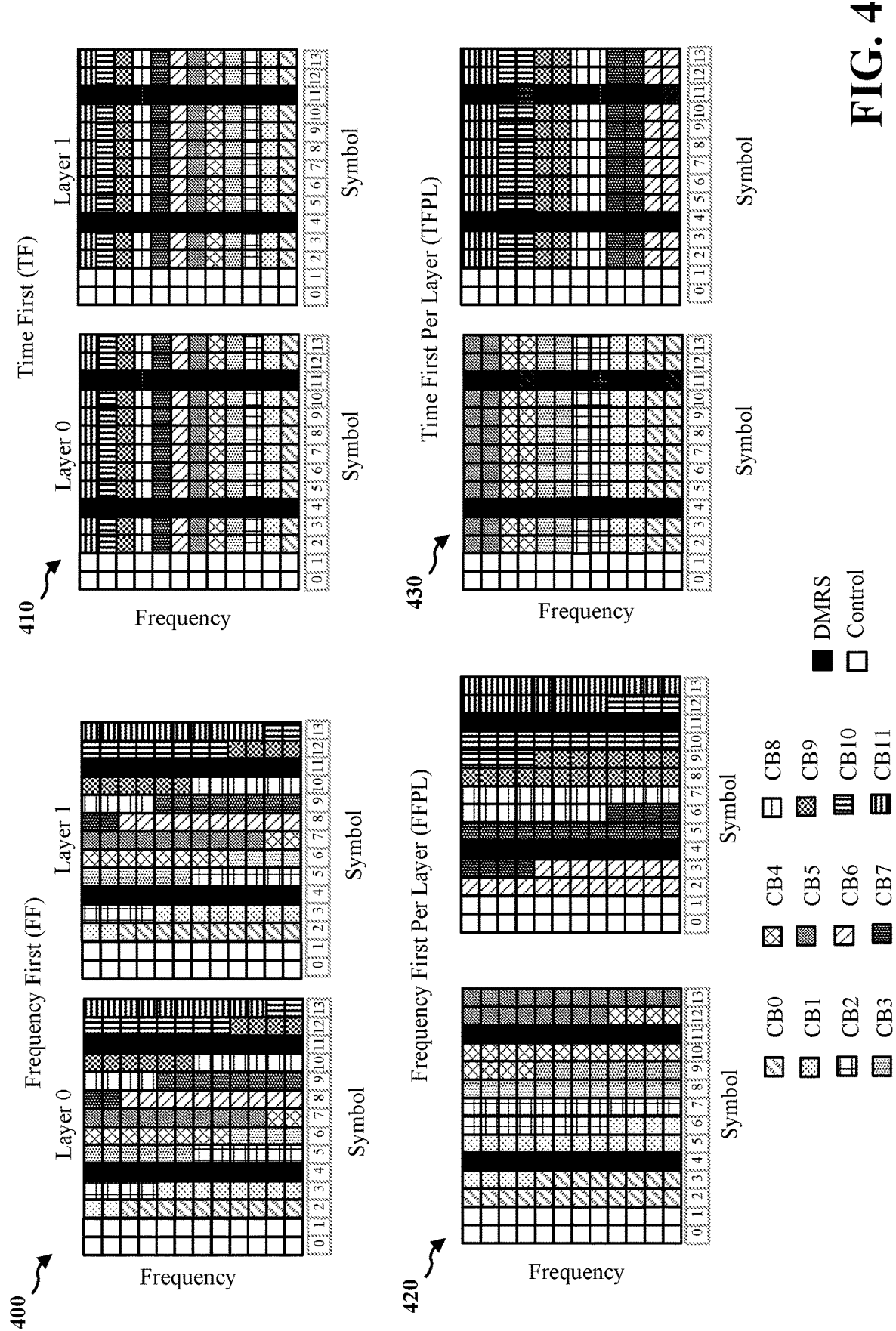
FIG. 4 is a diagram illustrating various code block (CB) to resource element (RE) mapping types.

FIG. 4 is a diagram illustrating various CB to RE mapping types. The examples are illustrated for two layers but may be extended to additional layers. A frequency first (FF) CB mapping type 400 maps the CBs across both layers in increasing frequency, then move to the next time-domain OFDM symbol. The time first (TF) CB mapping type 410 maps the CBs across available time-domain OFDM symbols first, then in increasing frequency. The frequency first per layer (FFPL) CB mapping type 420 maps the CBs in layer 0 in the frequency first order, then maps the CBs in layer 1. The time first per layer (TFPL) CB mapping type 430 maps the CBs in layer 0 in the time first order, then maps the CBs in layer 1.

As discussed above, the various CB to RE mapping types may provide better decoding performance in various scenarios. Generally, the performance differences may be due to different types of diversity provided by each mapping type. Time diversity may be enhanced or exploited when every CB is spanned across multiple OFDM symbols. Enhanced time diversity may be beneficial for scenarios with a relatively low time coherency of the channel (high Doppler spread) or in case that the channel estimation error is not equal for all the data OFDM symbols of the allocation. For example, channel estimation error may be significantly higher for the edge OFDM symbols of the allocation due to channel extrapolation. Frequency diversity may be enhanced or exploited when CBs are spanning across multiple RBs. Enhanced frequency diversity may be beneficial for scenarios with a relatively low channel coherency bandwidth (mid/high delay spread). Spatial or layer diversity (relevant only for the case of MIMO with rank >1) is enhanced or exploited when every CB is spanned across multiple layers. Enhanced spatial or layer diversity is desired as the imbalance between layers increases. For example, FF CB mapping type 400 provides frequency and spatial diversity for each CB, while TF CB mapping type 410 provides time diversity and spatial diversity. The FFPL CB mapping type 420 and the TFPL mapping type provide less spatial diversity but greater frequency and time diversity, respectively.

Figure 5:
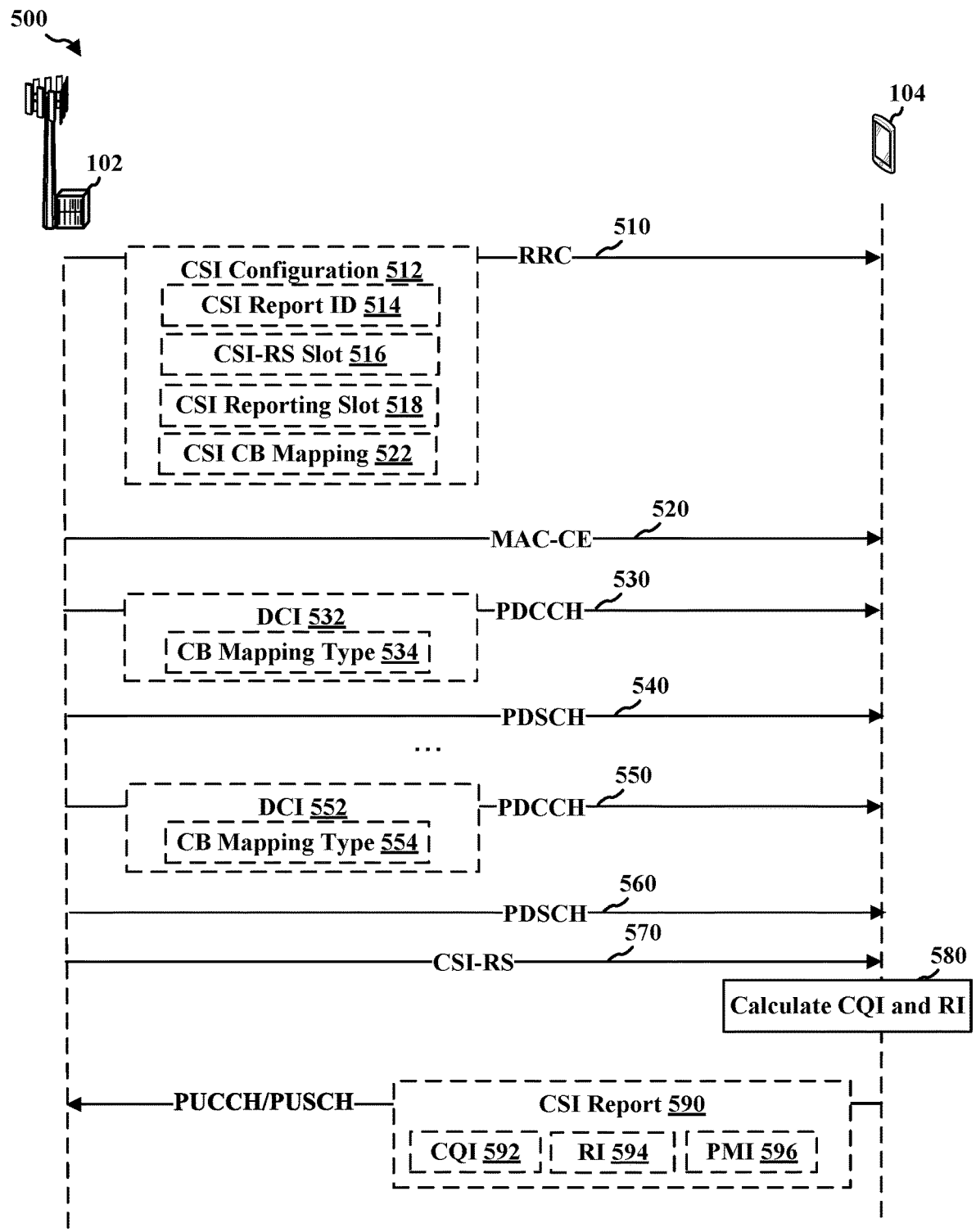
FIG. 5 is a message diagram illustrating example messages for dynamic CB mapping indication using downlink control information (DCI).

FIG. 5 is a message diagram 500 illustrating example messages for dynamic CB mapping indication using DCI. The use of the DCI to signal CB mapping type may allow per allocation variations of the CB mapping type selected by the network. In some implementations, the DCI-based signaling can accommodate some dependences of CB mapping type selection based on allocation size. In general, the DCI-based indication is applicable to a PDSCH in a single slot and not necessarily accountable for CSI evaluation based on a CSI-RS in a different slot. However, synchronizing both the UE and network sides on the same assumption for CB mapping type that is assumed for every CSF evaluation remains important for the network to select the CB mapping type.

A base station 102 may transmit an RRC message 510 including a CSI configuration 512. The CSI configuration 512 may be a configuration for periodic, semi-persistent, or aperiodic CSI reporting. The CSI configuration 512 may define a CSI reporting identifier (ID) 514. The CSI configuration 512 may indicate, for example, a CSI-RS slot 516 and a CSI reporting slot 518 for the CSI reporting ID. In some implementations, the CSI report ID 514 may be associated with a CSI CB mapping 522, which may be used for calculating a CQI and RI. In some implementations, the base station 102 may transmit a MAC-CE 520, which may activate or trigger a CSI report.

The base station may transmit a PDCCH 530 including a DCI 532. The DCI 532 may schedule a PDSCH 540 for the UE. The DCI 532 may also indicate a CB mapping type 534 for the PDSCH 540. The use of the DCI 532 to signal CB mapping type may allow per allocation variations of the CB mapping type selected by the network. For example, the base station may transmit one or more additional PDCCHs 550 including a DCI 552 with a different CB mapping type 554. Accordingly, the PDSCH 560 may follow a different CB mapping type than the PDSCH 540.

When the base station 102 transmits the CSI-RS 570, none of the previous DCIs 532, 552 or CB mapping types 534, 554 is specifically applicable to the CSI-RS 570. The UE 104 may calculate the CQI and RI based on the CSI-RS 570 and a commonly assumed dynamic CB mapping type. In an aspect, a rule may determine the commonly assumed dynamic CB mapping type based on one or more of the CB mapping types 534, 554 indicated for one or more previous PDSCH slots. For example, the commonly assumed dynamic CB mapping type may be based on a dynamic CB mapping type that is used for a largest plurality of PDSCH slots for a time window up to and including a CSI reference resource slot or the dynamic CB mapping type that is used for a most recent PDSCH slot prior to and including a CSI reference resource slot. In some implementations, the commonly assumed dynamic CB mapping type may be configured for a CSI report ID 512.

At block 580, the UE 104 may calculate the CQI and RI based on the CSI-RS 570 and the determined commonly assumed dynamic CB mapping type. For instance, the UE 104 may calculate the CQI as an index into a table defining a MCS that could be received with a desired block error rate under the channel conditions of the CSI-RS and using the commonly assumed dynamic CB mapping type. The UE 104 may calculate the RI based on the CSI-RS. For example, the UE 104 may select the RI that provides the best performance.

The UE 104 may transmit a CSI report 590 on either a PUCCH or PUSCH. The CSI report 590 may include, for example, the CQI 592, the RI 594, and/or a precoding matrix indicator (PMI) 596.

Figure 6:
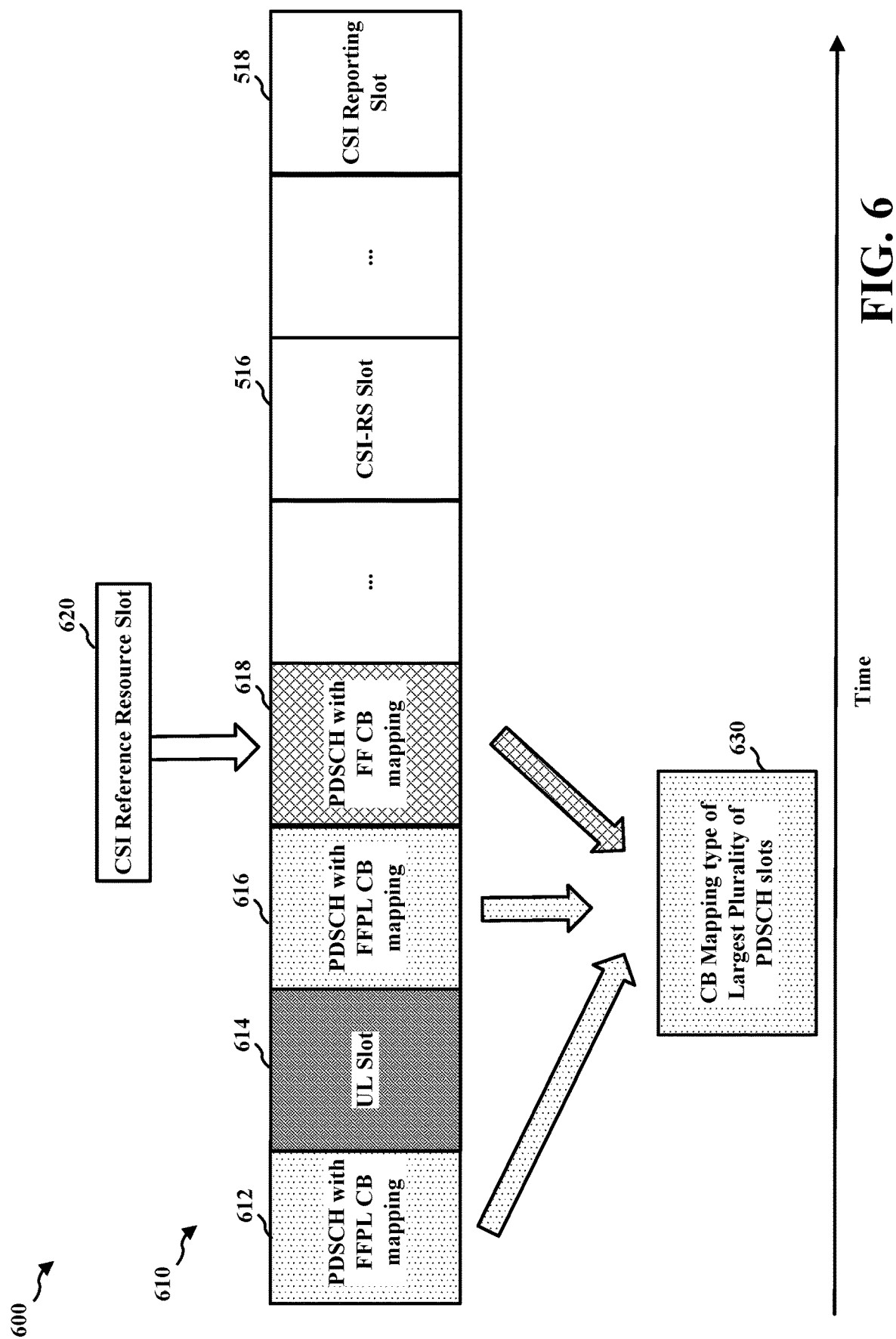
FIG. 6 illustrates an example of determining a CB mapping type for a CSI report when a CB mapping type for PDSCH is indicated by DCI.

FIG. 6 illustrates an example 600 of determining a CB mapping type for a CSI report when a CB mapping type for PDSCH is indicated by DCI. A DCI 532, 552 may schedule each slot 610 separately. For example, slots 612, 616, and 618 may be scheduled for PDSCH and slot 614 may be an uplink slot. The DCI 532, 552 may specify a CB mapping type for each PDSCH. For example, slots 612 and 616 may be scheduled with the FFPL CB mapping type 420, and slot 618 may be scheduled with the FF CB mapping type 400. The CSI configuration 512 may define the CSI-RS slot 516 and the CSI reporting slot 518.

A CSI reference resource slot 620 may be defined based on the CSI-RS slot 516 and the CSI reporting slot 518. The UE 104 may make the following assumptions about the CSI reference resource slot 620: The first 2 OFDM symbols are occupied by control signaling; the number of PDSCH and DM-RS symbols is equal to 12; the same bandwidth part subcarrier spacing configured as for the PDSCH reception; the bandwidth as configured for the corresponding CQI report; the reference resource uses the CP length and subcarrier spacing configured for PDSCH reception; no resource elements used by primary or secondary synchronization signals or PBCH; The redundancy version is 0; the ratio of PDSCH EPRE to CSI-RS EPRE is as given in Subclause 4.1; no REs are allocated for NZP CSI-RS and ZP CSI-RS; the same number of front loaded DM-RS symbols as the maximum front-loaded symbols configured by the higher layer parameter maxLength in DMRS-DownlinkConfig; the number of additional DM-RS symbols is the same as the additional symbols configured by the higher layer parameter dmrs-AdditionalPosition; the PDSCH symbols do not contain DM-RS; and the PRB bundling size is 2 PRBs. Additionally, a rule may define an assumption the UE 104 may make regarding the commonly assumed CB mapping type.

In some implementations, according to a first rule for DCI-based CB mapping indication, the UE 104 may assume a CB mapping type for a CSI report based on a voting approach where a CB mapping type that was used for the UE for a largest plurality 630 of PDSCH slots for a time window up to and including the CSI reference resource slot 620 is used as the assumption for CSF evaluation. For example, as illustrated in FIG. 6, the time window may be 4 slots before and including the CSI reference resource slot 620. In this example, two of the slots used the FFPL CB mapping type 420 and one slot used the FF CB mapping type 400, so the UE 104 may assume the FFPL CB mapping type 420 for CSF evaluation (e.g., calculating CQI and RI).

In some implementations, according to a second rule for DCI-based CB mapping indication, the UE 104 may assume a CB mapping type for a CSI report that is used for a most recent PDSCH slot prior to and including the CSI reference resource slot 620. That is, the UE 104 may assume that the CB mapping type for the CSI report is the CB mapping type for the CSI reference resource slot 620 or the most recent PDSCH prior to the CSI reference resource slot 620 if no PDSCH is received in the CSI reference resource slot 620. For instance, in the illustrated example of FIG. 6, the CSI reference resource slot 620 corresponds to slot 618, which was scheduled with the FF CB mapping type 400. Accordingly, the CB mapping type for the CSI report may be the FF CB mapping type 400.

In some implementations, according to a third rule for DCI-based CB mapping indication, the UE 104 may assume a CB mapping type is configured for the corresponding CSI report ID 514 as the CSI CB mapping 522. Dynamic reconfiguration/indication of the CSI CB mapping 522 may follow the dynamic CB mapping adaptation process. The type of dynamic reconfiguration/indication may depend on the scheduling of the CSI report. For SP CSI reports, MAC-CE signaling (e.g., MAC-CE 520) may reconfigure the CSI CB mapping 522. In some implementations, the MAC-CE signaling may be assisted by activation/reactivation of a CSI report by a DCI 532, 552. For AP CSI reports, the CB mapping type can be dynamically indicated via CSI-RS trigger state selected in the DCI triggering the AP CSI report. Dynamic reconfiguration of CB mapping type assumption for periodic CSI reports may rely on RRC reconfiguration. The RRC reconfiguration may not change as quickly as the DCI-based signaling for CB mapping type.

Figure 7:
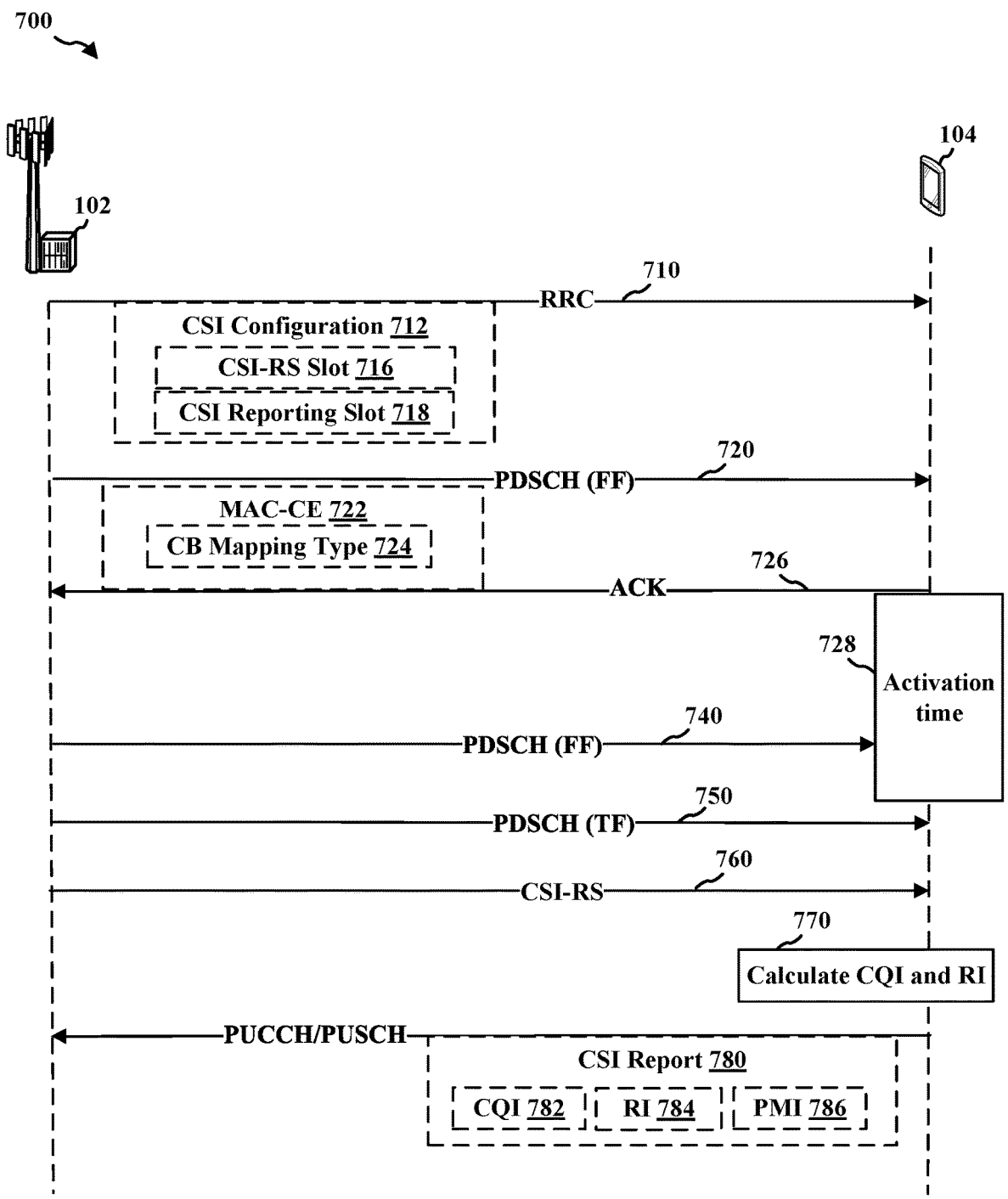
FIG. 7 is a message diagram illustrating example messages for dynamic CB mapping indication using media access control (MAC) control element (CE).

FIG. 7 is a message diagram 700 illustrating example messages for dynamic CB mapping indication using MAC-CE. MAC-CE based signaling may be suitable for cases where per-slot reconfiguration is not needed, which may be determined for a specific deployment. In this case, the UE may be configured with a few supported CB-mapping types (e.g., FF, FFPL, TF, TFPL), and one CB mapping type may be active at a time. This way, the activated CB type can be considered as deterministic by the UE and per-slot changes are not expected. MAC-CE based signaling may simplify the maintenance of CSF consistency because the CB mapping does not change in this case per allocation. Allocation size may not be taken into consideration for the CB mapping type select. MAC-CE based signaling may be simple for the NW scheduler to handle and avoids HARQ issues with changing CB mapping types.

Similar to the DCI-based signaling case, the base station 102 may transmit a CSI configuration 712 that defines a CSI-RS slot 716 and CSI reporting slot 718. The CSI configuration 712 may define a CSI report ID, but the commonly assumed dynamic CB mapping type for any CSI report ID may be based on the active CB mapping type.

The base station 102 may transmit a PDSCH 720 according to the active CB mapping type. As illustrated, the active CB mapping type may initially be the FF CB mapping type 400. The base station 102 may change the active CB mapping type by transmitting a MAC-CE 722. The MAC-CE 722 may be attached to a PDSCH (e.g., PDSCH 720). MAC-CE configuration has a predefined rule for an activation time 728 which defines a time/slot after the UL slot on which the ACK 726 for the MAC-CE reconfiguration command (e.g., MAC-CE 722 received over PDSCH 720) was transmitted. The UE 104 can assume the CB mapping type has changed after the activation time 728. This activation time 728 is usually set to the 4th slot after the ACK 726.

The base station 102 may transmit a PDSCH 740 after the ACK 726 but before the activation time 728. Accordingly, the PDSCH 740 may use the same CB mapping type as the PDSCH 720 although a new CB mapping type has been indicated. After the activation time 728, the base station 102 may transmit a PDSCH 750 that uses the new CB mapping type (e.g., TF CB mapping type 410).

The base station 102 may transmit a CSI-RS 760. For example, the timing of the CSI-RS 760 may be based on the CSI-RS slot 716. At block 770, the UE 104 may calculate CQI and RI based on the active CB mapping type. The UE 104 may transmit a CSI report 780 on either a PUCCH or PUSCH. The CSI report 780 may include the CQI 782, the RI 784, and/or the PMI 786.

Figure 8:
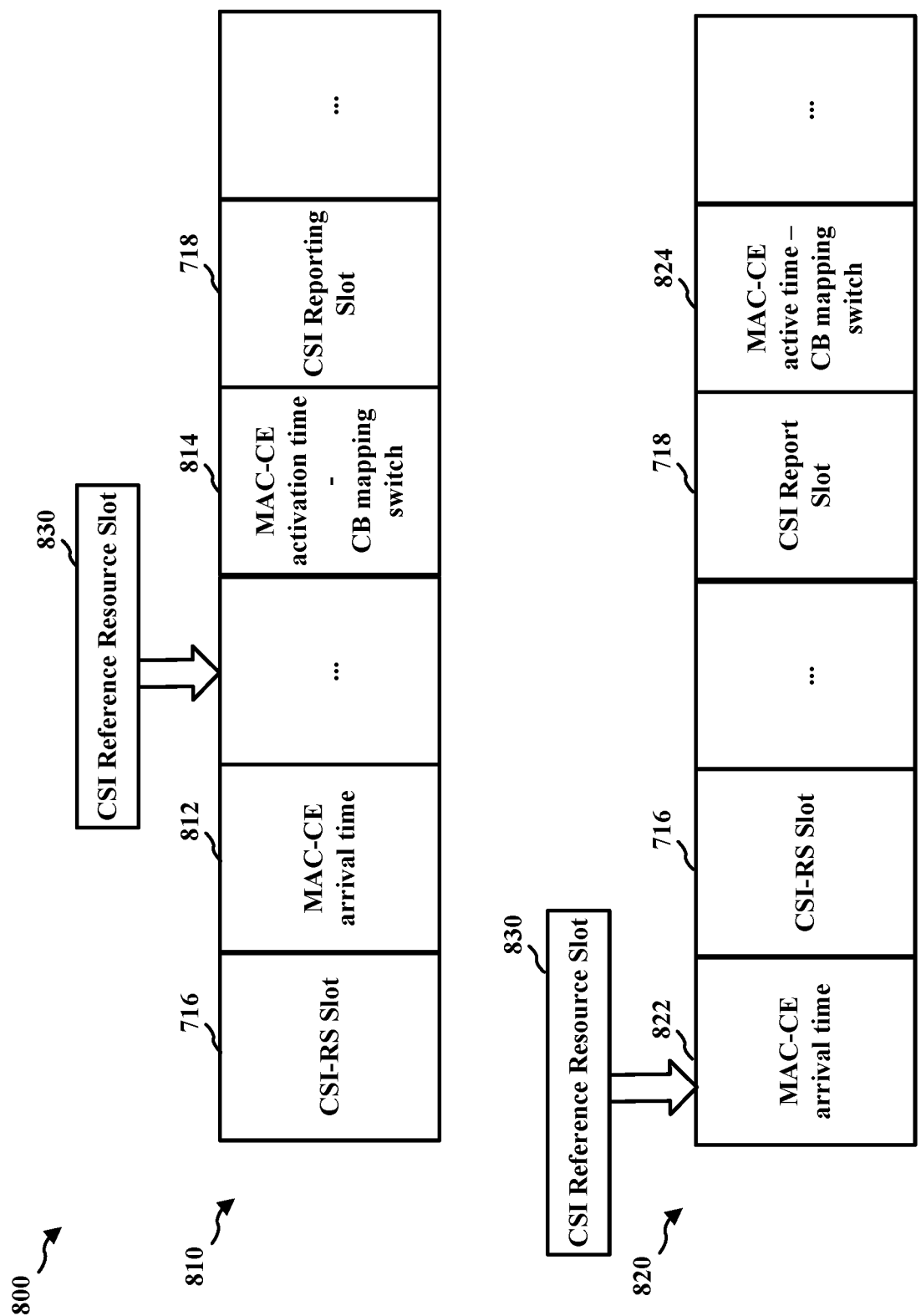
FIG. 8 is a diagram of example scenarios where the active CB mapping type changes during CSI reporting.

FIG. 8 is a diagram 800 of example scenarios where the active CB mapping type changes. Although the commonly assumed dynamic CB mapping type can generally be easily determined for CSF evaluation based on the active CB mapping type, there are several scenarios where the active CB mapping type may be defined by a rule. In a first scenario 810, the CSI-RS slot 716 may occur before the MAC-CE 722 arrives in a slot 812. The CSI reporting slot 718 may be after the activation time 728 in a slot 814. Accordingly, the active CB mapping type may change between the CSI-RS slot 716 and the CSI reporting slot 718. In a second scenario 820, the MAC-CE 722 may arrive in slot 822 before the CSI-RS slot 716, and the CSI reporting slot 718 may occur before the MAC-CE activation time 728 in slot 824. Accordingly, the CSI reporting may occur after the new active CB mapping type is indicated, but before the new active CB mapping type is activated.

In some implementations, according to a first rule for MAC-CE-based CB mapping indication, the UE 104 may assume that the commonly assumed dynamic CB mapping type for CSI reporting is the active CB mapping type that is active on the CSI reference resource slot. The timing of the CSI reference resource slot 830 may be based on the CSI reporting slot 718 and may occur before or after the CSI-RS slot. In either case, the CSI reference resource slot 830 may be compared with the MAC-CE activation time 728 to determine the active CB mapping type at the time of the CSI reference resource slot 830.

In some implementations, according to a second rule for MAC-CE-based CB mapping indication, the UE 104 may assume that the active CB mapping type for CSI reporting is the active CB mapping type that is active on the slot where the CSI-RS resources corresponding to the CSI report are allocated. That is, the commonly assumed dynamic CB mapping type may be the active CB mapping type for the CSI-RS slot 716 even though the CSI-RS slot 716 may not include a PDSCH using the active CB mapping type. For instance, in both the first scenario 810 and the second scenario 820, the UE 104 may assume the old active CB mapping type because the new CB mapping type is not activated until after the CSI-RS slot 716.

In some implementations, according to a third rule for MAC-CE-based CB mapping indication with AP scheduling of the CSI report, the UE 104 may assume that the active CB mapping type for CSI reporting is the active CB mapping type that is active on the slot where the AP CSI report scheduling (e.g., a DCI) was received. The slot including the AP CSI report scheduling may be compared with the MAC-CE activation time 728 to determine the active CB mapping type at the time of the AP CSI report scheduling.

Figure 9:
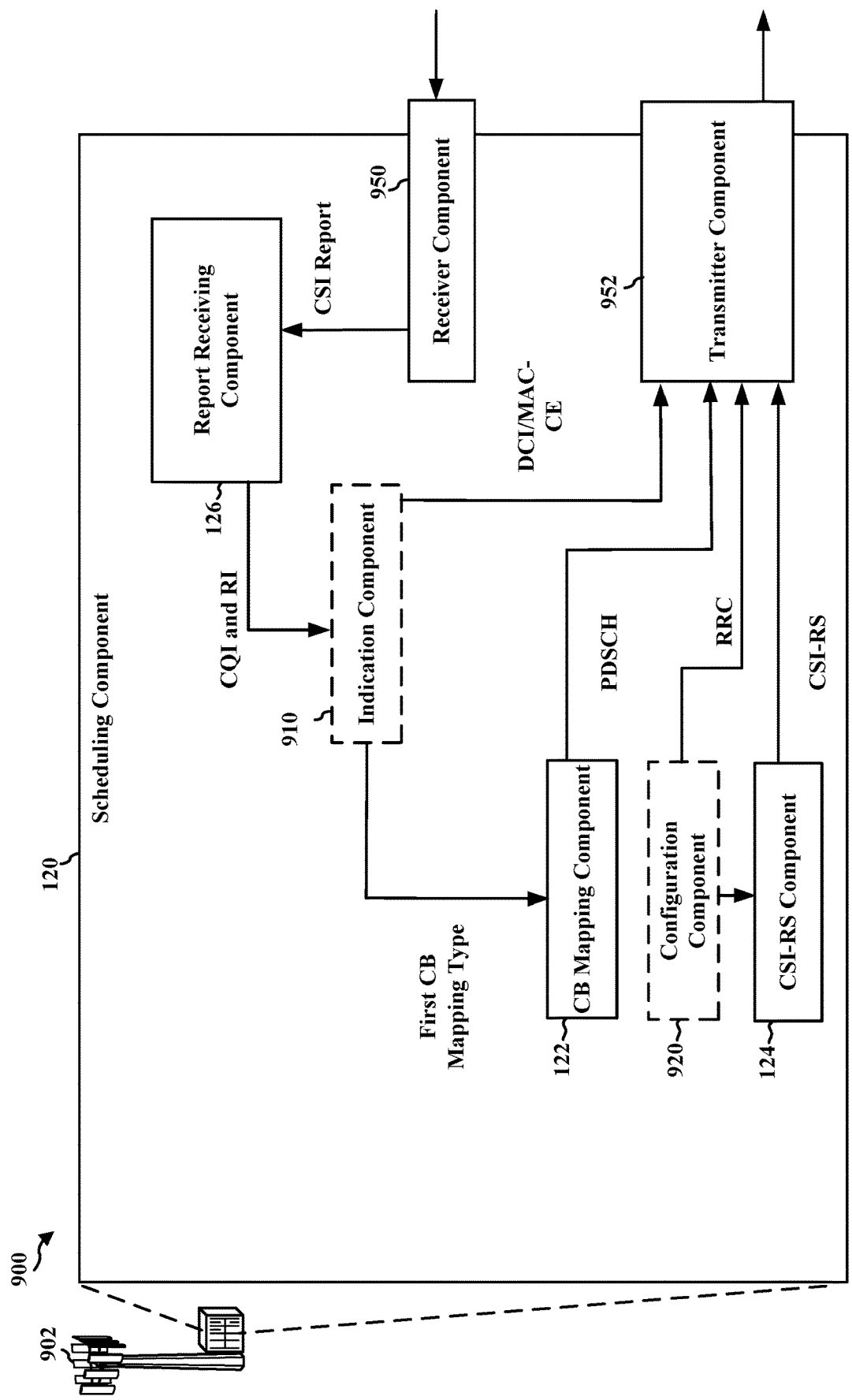
FIG. 9 is a conceptual data flow diagram illustrating the data flow between different means/components in an example base station.

FIG. 9 is a conceptual data flow diagram 900 illustrating the data flow between different means/components in an example base station 902, which may be an example of the base station 102 including the scheduling component 120. The scheduling component 120 may include the CB mapping component 122, the CSI-RS component 124, and the report receiving component 126. The scheduling component 120 may optionally include an indication component 910.

The base station 902 may also may include a receiver component 950 and a transmitter component 952. The receiver component 950 may include, for example, a RF receiver for receiving the signals described herein. The transmitter component 952 may include for example, an RF transmitter for transmitting the signals described herein. In some implementations, the receiver component 950 and the transmitter component 952 may be co-located in a transceiver such as the Tx/Rx 318 in FIG. 3.

The receiver component 950 may receive uplink signals from UEs 104. For example, the receiver component 950 may receive a CSI report 590, 780 or an ACK 726. The receiver component 950 may provide the CSI report 590, 780 to the report receiving component 126. The receiver component 950 may provide the ACK 726 to the indication component 910.

The CB mapping component 122 may be configured to transmit a PDSCH based on a first dynamic CB mapping type in one or more slots. The CB mapping component 122 may receive the CBs for the PDSCH from higher layers (e.g., an encoder). In some implementations, the CB mapping component 122 may receive an indication of the first CB mapping type from the indication component 910. The CB mapping component 122 may map the CBs to REs according to the first CB mapping type, for example, as illustrated in FIG. 4. The CB mapping component 122 may transmit the PDSCH via the transmitter component 952.

The CSI-RS component 124 may be configured to transmit a CSI-RS. In some implementations, the CSI-RS component 124 may transmit the CSI-RS according to the CSI configuration 512, 712. For instance, the CSI-RS component 124 may transmit the CSI-RS 570, 760 in the CSI-RS slot 516, 716. In some implementations, the CSI-RS component 124 may receive the CSI configuration 512, 712 or the CSI-RS slot 516, 716 from the configuration component 920.

The report receiving component 126 may be configured to receive a CSI report including a CQI and RI based on the CSI-RS assuming a second dynamic CB mapping type. The second dynamic CB mapping type may be the commonly assumed CB mapping type. The report receiving component 950 may receive the CSI report 590, 780 via the receiver component 950. The report receiving component 126 may decode the CSI report 590, 780 to determine the CQI 592, 782 and the RI 594, 784. In some implementations, the report receiving component 126 may provide the CQI 592, 782 and the RI 594, 784 to the indication component 910.

The indication component 910 may be configured to select the first CB mapping type and transmit an indication of the first CB mapping type to the UE 104. The indication component 910 may determine the first CB mapping type based on the CQI 592, 782 and the RI 594, 784, as well as other measurements such as a Doppler shift or estimated speed of the UE 104. The indication component 910 may transmit the indication of the first CB mapping type via the transmitter component 952 as either a DCI 532, 552, or a MAC-CE 722. The indication component 910 may receive the ACK 726 via the receiver component 950 indicating that the MAC-CE was correctly received and that the indicated mapping type will be activated after the activation time. The indication component 910 may also provide an indication of the first CB mapping type to the CB mapping component 122.

The configuration component 920 may be configured to configure a CSI report for a UE. For example, the configuration component 920 may transmit the CSI configuration 512, 712 to the UE via the transmitter component 952. In some implementations, the configuration component 920 may configure the second dynamic CB mapping type for an identifier of the CSI report (e.g., CSI report ID 512). For example, the configuration component 920 may transmit an RRC message, MAC-CE, or DCI to update the second dynamic CB mapping type for CSI reporting based on a type of scheduling of the CSI report corresponding to the CSI report ID 512.

Figure 10:
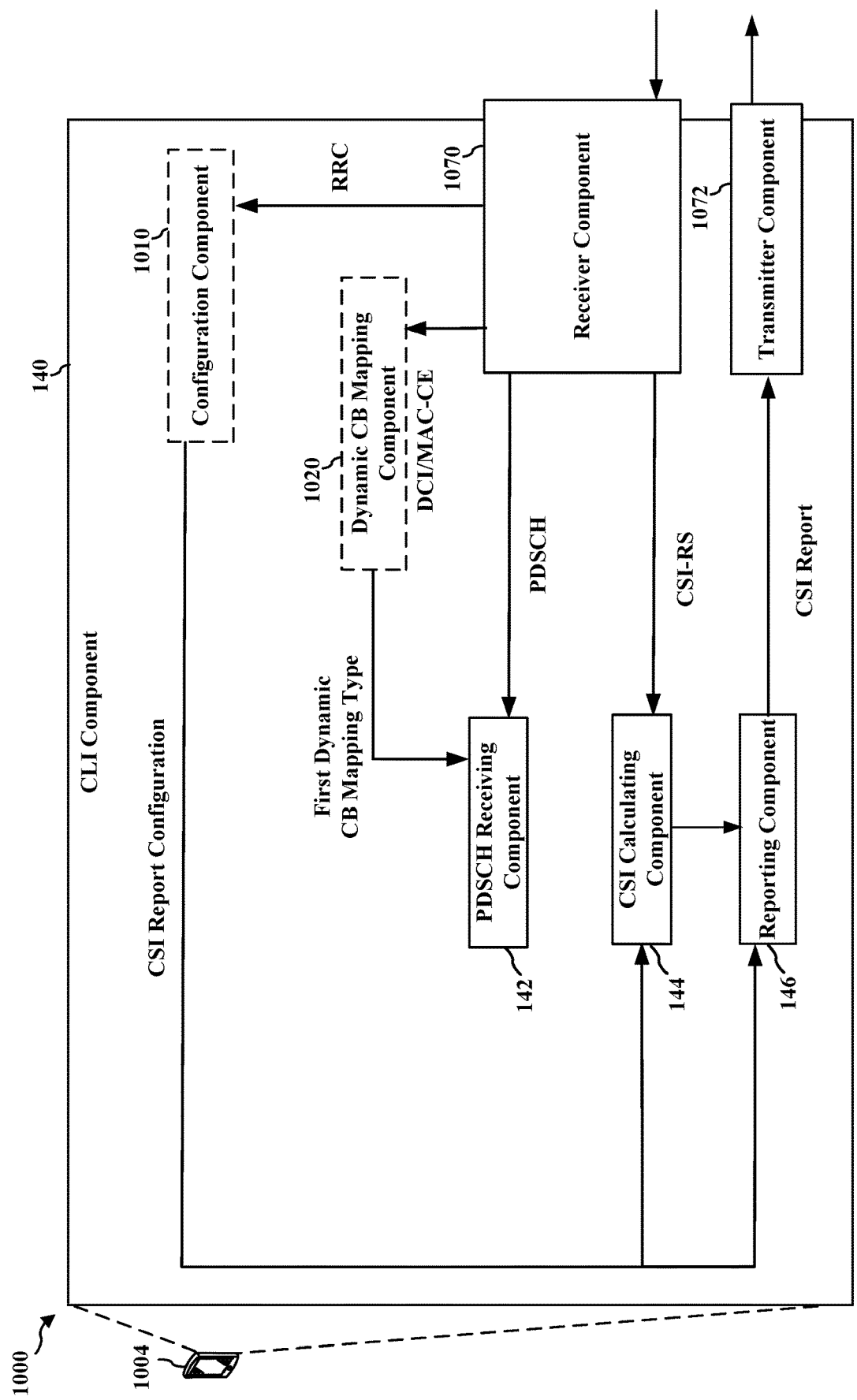
FIG. 10 is a conceptual data flow diagram illustrating the data flow between different means/components in an example UE.

FIG. 10 is a conceptual data flow diagram 1000 illustrating the data flow between different means/components in an example UE 1004, which may be an example of the UE 104 and include the CSF component 140. As discussed with respect to FIG. 1, the CSF component 140 may include the PDSCH receiving component 142, the CSI calculating component 144, and the reporting component 146. The CSF component 140 may optionally include a configuration component 1010 and/or a dynamic CB mapping component 1020. The UE 104 also may include a receiver component 1070 and a transmitter component 1072. The receiver component 1070 may include, for example, a radio-frequency (RF) receiver for receiving the signals described herein. The transmitter component 1072 may include for example, an RF transmitter for transmitting the signals described herein. In some implementations, the receiver component 1070 and the transmitter component 1072 may be co-located in a transceiver.

The receiver component 1070 may receive downlink signals such as the CSI configuration 512, 712, the MAC-CE 520, 722, the DCI 532, 552, and the PDSCH 540, 560, 720, 740, 750. The receiver component 1070 may provide the CSI configuration 512, 712 and/or the MAC-CE 520 to the configuration component 1010. The receiver component 1070 may provide the MAC-CE 722 and/or the DCI 532, 552 to the dynamic CB mapping component 1020. The receiver component 1070 may provide the PDSCH 540, 560, 720, 740, 750 to the PDSCH receiving component 142.

The PDSCH receiving component 142 may be configured to receive a PDSCH based on a first dynamic CB mapping type in one or more slots. For example, the PDSCH receiving component 142 may receive the PDSCH 540, 560, 720, 740, 750 via the receiver component 1070. The PDSCH receiving component 142 may decode a received PDSCH based on the first dynamic CB mapping type, which may be indicated by the dynamic CB mapping component. The PDSCH receiving component 142 may demap the REs of the PDSCH to the CBs, then decode each CB separately.

The CSI calculating component 144 may be configured to calculate a CQI and RI based on a CSI-RS assuming a second dynamic CB mapping type. The CSI calculating component 144 may receive the CSI-RS 570, 760 via the receiver component 1070. The CSI calculating component 144 may determine the timing of the CSI-RS 570, 760 and a CSI report based on a CSI configuration indicated by the configuration component 1010. The CSI calculating component 144 may determine the second dynamic CB mapping type according to a rule for commonly assumed dynamic CB mapping based on a configured type of dynamic CB mapping indication (e.g., either DCI-based or MAC-CE based). The CSI calculating component 144 may provide the CQI 592, 782 and RI 594, 784 to the reporting component 146.

The reporting component 146 may be configured to transmit a CSI report including the CQI and the RI. The reporting component 146 may receive the CQI 592, 782 and RI 594, 784 from the CSI calculating component 144. The reporting component 146 may generate the CSI report 590 and transmit the CSI report 590 via the transmitter component 1072.

The configuration component 1010 may be configured to receive a CSI configuration. For example, the configuration component 1010 may receive the CSI configuration 512, 712 as an RRC message 510, 710 via the receiver component 1070. The configuration component 1010 may decode the CSI configuration 512, 712 to determine the CSI report ID 514, CSI-RS slot 516, 716, the CSI reporting slot 518, 718, and/or the CSI CB mapping 522. In some implementations, the configuration component 1010 may receive an update to the CSI configuration (e.g., a new CSI CB mapping 522 for the CSI report ID 514) via an RRC, MAC-CE, or DCI. The configuration component 1010 may provide the CSI-RS slot 516, 716 to the CSI calculating component 144. The configuration component 1010 may provide the CSI reporting slot 518, 718 to the reporting component 146.

The dynamic CB mapping component 1020 may be configured to determine the first dynamic CB mapping type. The dynamic CB mapping component 1020 may the receive DCI 532, 552 or the MAC-CE 722 via the receiver component 1070. The DCI 532, 552 may indicate a dynamic CB mapping type for a specific slot or PDSCH. The dynamic CB mapping component 1020 may determine a slot when a new dynamic CB mapping type becomes active based on the activation time 728. The dynamic CB mapping component 1020 may provide the first dynamic CB mapping type for each slot or PDSCH to the PDSCH receiving component 142.

Figure 11:
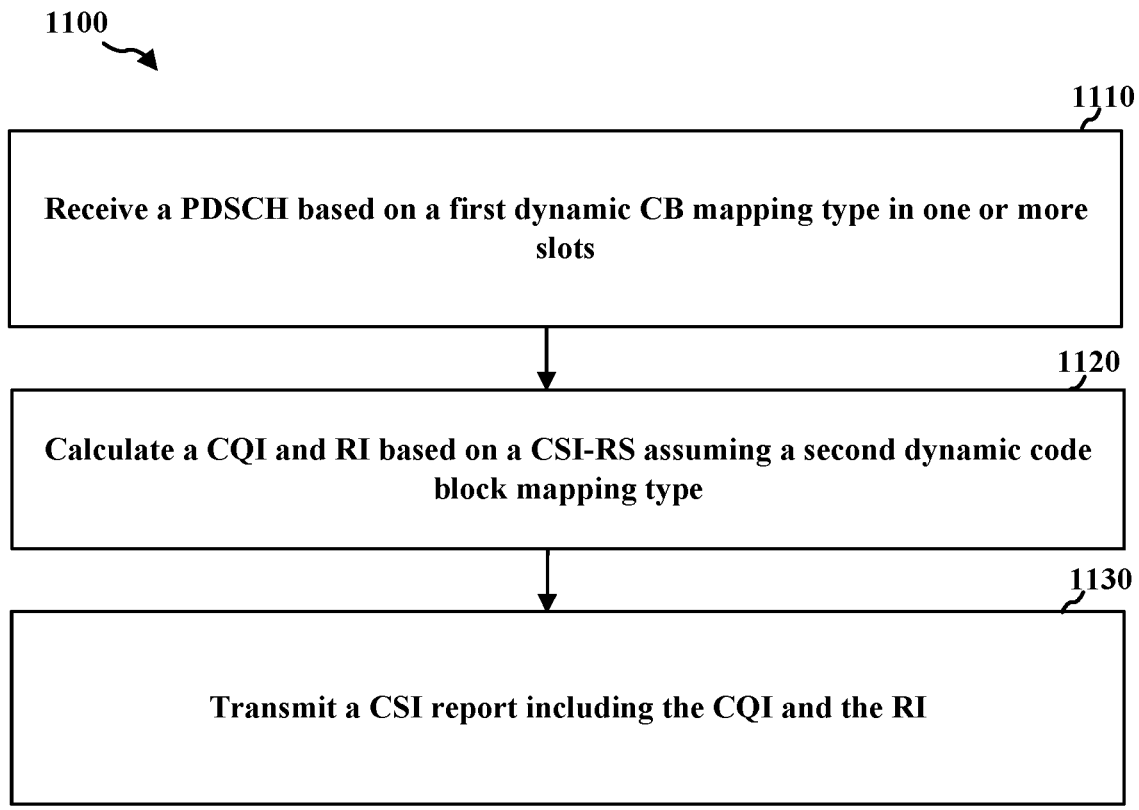
FIG. 11 is a flowchart of an example method 1100 for a UE to report CSI assuming a dynamic CB mapping type.

FIG. 11 is a flowchart of an example method 1100 for a UE to report CSI assuming a dynamic CB mapping type. The method 1100 may be performed by a UE (such as the UE 104, which may include the memory 360 and which may be the entire UE 104 or a component of the UE 104 such as the CSF component 140, Tx processor 368, the Rx processor 356, or the controller/processor 359). The method 1100 may be performed by the CSF component 140 in communication with the scheduling component 120 of the base station 102. Optional blocks are shown with dashed lines.

At block 1110, the method 1100 includes receiving a PDSCH based on a first dynamic CB mapping type in one or more slots. In some implementations, for example, the UE 104, the Rx processor 356, or the controller/processor 359 may execute the CSF component 140 or the PDSCH receiving component 142 to receive a PDSCH 540, 560, 720, 740, 750 based on a first dynamic CB mapping type in one or more slots. The first dynamic CB mapping type may be a dynamic CB mapping type for each of the one or more slots or an active dynamic CB mapping type. In some implementations, the first dynamic CB mapping type (e.g., CB mapping type 724) is indicated by a MAC-CE 722. In some implementations, the first dynamic CB mapping type is indicated by a DCI 532, 552. Accordingly, the UE 104, the Rx processor 356, or the controller/processor 359 executing the CSF component 140 or the PDSCH receiving component 142 may provide means for receiving a PDSCH based on a first dynamic CB mapping type in one or more slots.

At block 1120, the method 1100 includes calculating a CQI and RI based on a CSI-RS assuming a second dynamic CB mapping type. In some implementations, for example, the UE 104, the Rx processor 356, or the controller/processor 359 may execute the CSF component 140 or the CSI calculating component 144 to calculate a CQI and RI based on a CSI-RS 570, 760 assuming a second dynamic CB mapping type. In some implementations where the first dynamic CB mapping type is indicated by a MAC-CE, the second dynamic CB mapping type is the first dynamic CB mapping type that is active in a CSI reference resource slot. In some implementations where the first dynamic CB mapping type is indicated by a MAC-CE, the second dynamic CB mapping type is the first dynamic CB mapping type that is active on a slot where CSI-RS resources corresponding to the CSI report are allocated. In some implementations where the first dynamic CB mapping type is indicated by a MAC-CE, the second dynamic CB mapping type is the first dynamic CB mapping type that is active on a slot where a request for an aperiodic CSI report has been received. In some implementations where the first dynamic CB mapping type is indicated by a DCI, the second dynamic CB mapping type is the first dynamic CB mapping type that is used for a largest plurality of PDSCH slots for a time window up to and including a CSI reference resource slot. In some implementations where the first dynamic CB mapping type is indicated by a DCI, the second dynamic CB mapping type is the first dynamic CB mapping type that is used for a most recent PDSCH slot prior to and including a CSI reference resource slot. In some implementations where the first dynamic CB mapping type is indicated by a DCI, the second dynamic CB mapping type is configured for an identifier of the CSI report. For example, the configuration of the second dynamic CB mapping type may be carried in an RRC message for a periodic CSI report, in a MAC-CE for a semi-persistent CSI report, or a CSI-RS trigger state for an aperiodic CSI report. Accordingly, the UE 104, the Rx processor 356, or the controller/processor 359 executing the CSF component 140 or the CSI calculating component 144 may provide means for calculating a CQI and RI based on a CSI-RS assuming a second dynamic CB mapping type.

At block 1130, the method 1100 may include transmitting a CSI report including the CQI and the RI. In some implementations, for example, the UE 104, the Tx processor 368, or the controller/processor 359 may execute the CSF component 140 or the reporting component 146 to transmit a CSI report including the CQI and the RI. Accordingly, the UE 104, the Tx processor 368, or the controller/processor 359 executing the CSF component 140 or the reporting component 146 may provide means for transmitting a CSI report including the CQI and the RI.

Figure 12:
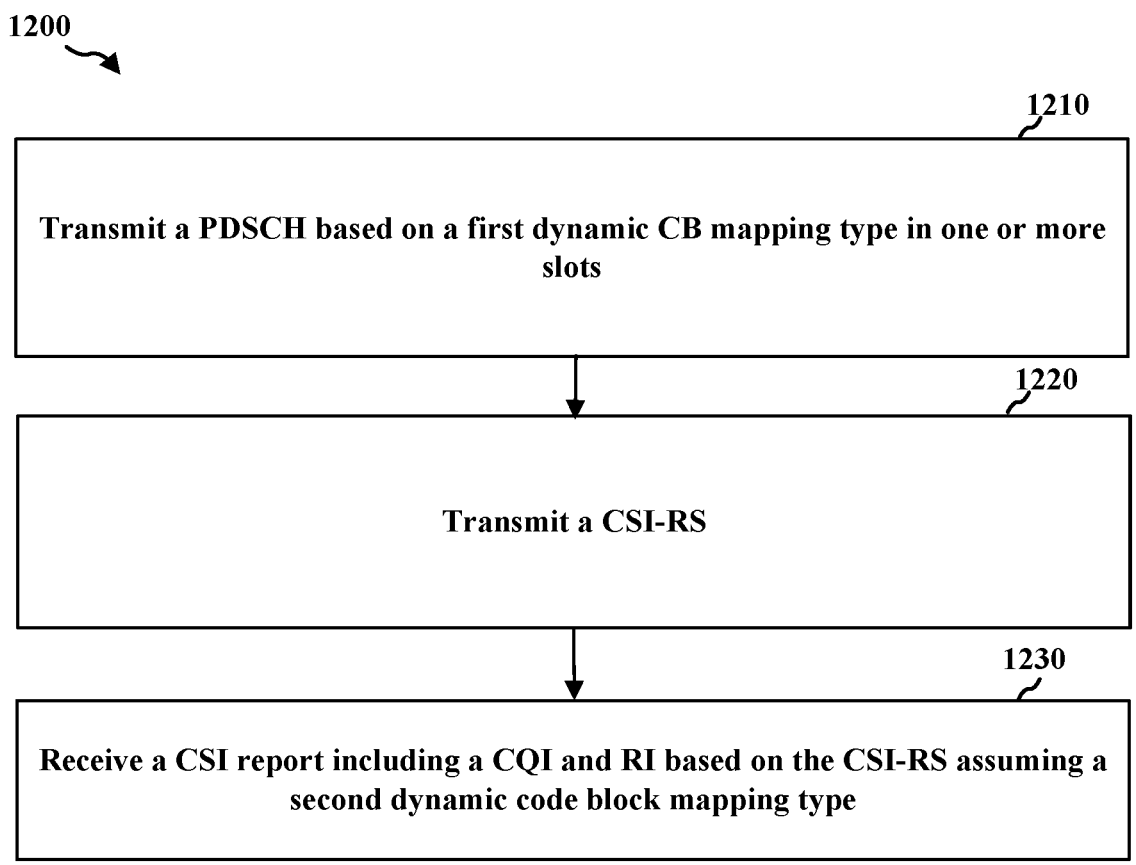
FIG. 12 a flowchart of an example method for a base station to receive a CSI report with a CB mapping assumption consistent with a dynamic CB mapping.

FIG. 12 a flowchart of an example method 1200 for a base station to receive a CSI report with a CB mapping assumption consistent with a dynamic CB mapping. The method 1200 may be performed by a base station (such as the base station 102, which may include the memory 376 and which may be the entire base station 102 or a component of the base station 102 such as the scheduling component 120, Tx processor 316, the Rx processor 370, or the controller/processor 375). The method 1200 may be performed by the scheduling component 120 in communication with the CSF component 140 of the UE 104.

At block 1210, the method 1200 includes transmitting a PDSCH based on a first dynamic CB mapping type in one or more slots. In some implementations, for example, the base station 102, Tx processor 316, or the controller/processor 375 may execute the scheduling component 120 or the CB mapping component 122 to transmit a PDSCH based on a first dynamic CB mapping type in one or more slots. Accordingly, the base station 102, Tx processor 316, or the controller/processor 375 executing the scheduling component 120 or the CB mapping component 122 may provide means for transmitting a PDSCH based on a first dynamic CB mapping type in one or more slots.

At block 1220, the method 1200 includes transmitting a CSI-RS. In some implementations, for example, the base station 102, Tx processor 316, or the controller/processor 375 may execute the scheduling component 120 or the CSI-RS component 124 to transmit the CSI-RS 570, 760. Accordingly, the base station 102, Tx processor 316, or the controller/processor 375 executing the scheduling component 120 or the CSI-RS component 126 may provide means for transmitting a CSI-RS.

At block 1230, the method 1200 includes receiving a CSI report including a CQI and RI based on the CSI-RS assuming a second dynamic CB mapping type. In some implementations, for example, the base station 102, Rx processor 370, or the controller/processor 375 may execute the scheduling component 120 or the report receiving component 126 to receive a CSI report 590, 780 including a CQI 592, 782 and a RI 594, 784 based on the CSI-RS 570, 760 assuming a second dynamic CB mapping type. The second dynamic CB mapping type may be a commonly assumed dynamic CB mapping type. In some implementations where the first dynamic CB mapping type is indicated by a MAC-CE, the second dynamic CB mapping type is the first dynamic CB mapping type that is active in a CSI reference resource slot. In some implementations where the first dynamic CB mapping type is indicated by a MAC-CE, the second dynamic CB mapping type is the first dynamic CB mapping type that is active on a slot where CSI-RS resources corresponding to the CSI report are allocated. In some implementations where the first dynamic CB mapping type is indicated by a MAC-CE, the second dynamic CB mapping type is the first dynamic CB mapping type that is active on a slot where a request for an aperiodic CSI report has been received. In some implementations where the first dynamic CB mapping type is indicated by a DCI, the second dynamic CB mapping type is the first dynamic CB mapping type that is used for a largest plurality of PDSCH slots for a time window up to and including a CSI reference resource slot. In some implementations where the first dynamic CB mapping type is indicated by a DCI, the second dynamic CB mapping type is the first dynamic CB mapping type that is used for a most recent PDSCH slot prior to and including a CSI reference resource slot. In some implementations where the first dynamic CB mapping type is indicated by a DCI, the second dynamic CB mapping type is configured for an identifier of the CSI report. For example, the configuration of the second dynamic CB mapping type may be carried in an RRC message for a periodic CSI report, in a MAC-CE for a semi-persistent CSI report, or a CSI-RS trigger state for an aperiodic CSI report. Accordingly, the base station 102, the Rx processor 370, or the controller/processor 375 executing the scheduling component 120 or the report receiving component 126 may provide means for receiving a CSI report including a CQI and RI based on the CSI-RS assuming a second dynamic CB mapping type.

SOME FURTHER EXAMPLE CLAUSES

Implementation examples are described in the following numbered clauses:

1. A method of wireless communication, comprising:
   receiving a physical downlink shared channel (PDSCH) based on a first dynamic code block (CB) mapping type in one or more slots;
   calculating a channel quality indicator (CQI) and a rank indicator (RI) based on a channel state information reference signal (CSI-RS) assuming a second dynamic CB mapping type; and
   transmitting a channel state information (CSI) report including the CQI and the RI.
2. The method of clause 1, wherein the first dynamic CB mapping type is indicated by a MAC-CE.
3. The method of clause 2, wherein the second dynamic CB mapping type is the first dynamic CB mapping type that is active in a CSI reference resource slot.
4. The method of clause 2, wherein the second dynamic CB mapping type is the first dynamic CB mapping type that is active on a slot where CSI-RS resources corresponding to the CSI report are allocated.
5. The method of clause 2, wherein the second dynamic CB mapping type is the first dynamic CB mapping type that is active on a slot where a request for an aperiodic CSI report has been received.
6. The method of clause 1, wherein the first dynamic CB mapping type is indicated by a DCI.
7. The method of clause 6, wherein the second dynamic CB mapping type is the first dynamic CB mapping type that is used for a largest plurality of PDSCH slots for a time window up to and including a CSI reference resource slot.
8. The method of clause 6, wherein the second dynamic CB mapping type is the first dynamic CB mapping type that is used for a most recent PDSCH slot prior to and including a CSI reference resource slot.
9. The method of clause 6, wherein the second dynamic CB mapping type is configured for an identifier of the CSI report.
10. The method of clause 9, wherein the configuration of the second dynamic CB mapping type is carried in an RRC message for a periodic CSI report, in a MAC-CE for a semi-persistent CSI report, or a CSI-RS trigger state for an aperiodic CSI report.
11. An apparatus for wireless communication, comprising:
    a transceiver;
    a memory storing computer-executable instructions; and
    a processor coupled with the transceiver and the memory and configured to execute the computer-executable instructions to perform the method of any of clauses 1-10.
12. An apparatus for wireless communication, comprising: means for performing the method of any of clauses 1-10.
13. A non-transitory computer-readable medium storing computer executable code, the code when executed by a processor causes the processor to perform the method of any of clauses 1-10.
14. A method of wireless communication at a base station, comprising:

transmitting a physical downlink shared channel (PDSCH) based on a first dynamic code block (CB) mapping type in one or more slots;

transmitting a channel state information reference signal (CSI-RS); and receiving a channel state information (CSI) report including a channel quality indicator (CQI) and a rank indicator (RI) based on the CSI-RS assuming a second dynamic CB mapping type.

15. The method of clause 14, wherein the first dynamic CB mapping type is indicated by a MAC-CE.

16. The method of clause 15, wherein the second dynamic CB mapping type is the first dynamic CB mapping type that is active in a CSI reference resource slot.

17. The method of clause 15, wherein the second dynamic CB mapping type is the first dynamic CB mapping type that is active on a slot where CSI-RS resources corresponding to the CSI report are allocated.

18. The method of clause 15, wherein the second dynamic CB mapping type is the first dynamic CB mapping type that is active on a slot where a request for an aperiodic CSI report has been received.

19. The method of clause 14, wherein the first dynamic CB mapping type is indicated by a DCI.

20. The method of clause 19, wherein the second dynamic CB mapping type is the first dynamic CB mapping type that is used for a largest plurality of PDSCH slots for a time window up to and including a CSI reference resource slot.

21. The method of clause 19, wherein the second dynamic CB mapping type is the first dynamic CB mapping type that is used for a most recent PDSCH slot prior to and including a CSI reference resource slot.

22. The method of clause 19, wherein the second dynamic CB mapping type is configured for an identifier of the CSI report.

23. The method of clause 22, wherein the configuration of the second dynamic CB mapping type is carried in an RRC message for a periodic CSI report, in a MAC-CE for a semi-persistent CSI report, or a CSI-RS trigger state for an aperiodic CSI report.

24. An apparatus for wireless communication, comprising:
a transceiver;
a memory storing computer-executable instructions; and
a processor coupled with the transceiver and the memory and configured to execute the computer-executable instructions to perform the method of any of clauses 14-23.

25. An apparatus for wireless communication, comprising: means for performing the method of any of clauses 14-23.

26. A non-transitory computer-readable medium storing computer executable code, the code when executed by a processor causes the processor to perform the method of any of clauses 14-23.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
receiving a physical downlink shared channel (PDSCH) based on a first dynamic code block (CB) mapping type in one or more slots;
receiving a channel state information reference signal (CSI-RS);
calculating a channel quality indicator (CQI) and a rank indicator (RI) based on the CSI-RS and a second dynamic CB mapping type; and
transmitting a channel state information (CSI) report including the CQI and the RI.

2. The method of claim 1, wherein the first dynamic CB mapping type is indicated by a MAC-CE.

3. The method of claim 2, wherein the second dynamic CB mapping type is the first dynamic CB mapping type that is active in a CSI reference resource slot.

4. The method of claim 2, wherein the second dynamic CB mapping type is the first dynamic CB mapping type that is active on a slot where CSI-RS resources corresponding to the CSI report are allocated.

5. The method of claim 2, wherein the second dynamic CB mapping type is the first dynamic CB mapping type that is active on a slot where a request for an aperiodic CSI report has been received.

6. The method of claim 1, wherein the first dynamic CB mapping type is indicated by a DCI.

7. The method of claim 6, wherein the second dynamic CB mapping type is the first dynamic CB mapping type that is used for a largest plurality of PDSCH slots for a time window up to and including a CSI reference resource slot.

8. The method of claim 6, wherein the second dynamic CB mapping type is the first dynamic CB mapping type that is used for a most recent PDSCH slot prior to and including a CSI reference resource slot.

9. The method of claim 6, wherein the second dynamic CB mapping type is configured for an identifier of the CSI report.

10. The method of claim 9, wherein a configuration of the second dynamic CB mapping type is carried in an RRC message for a periodic CSI report, in a MAC-CE for a semi-persistent CSI report, or a CSI-RS trigger state for an aperiodic CSI report.

11. A method of wireless communication at a base station, comprising:
- transmitting a physical downlink shared channel (PDSCH) based on a first dynamic code block (CB) mapping type in one or more slots;
- transmitting a channel state information reference signal (CSI-RS); and
- receiving a channel state information (CSI) report including a channel quality indicator (CQI) and a rank indicator (RI), the CSI report based on the CSI-RS and a second dynamic CB mapping type.

12. The method of claim 11, wherein the first dynamic CB mapping type is indicated by a MAC-CE.

13. The method of claim 12, wherein the second dynamic CB mapping type is the first dynamic CB mapping type that is active in a CSI reference resource slot.

14. The method of claim 12, wherein the second dynamic CB mapping type is the first dynamic CB mapping type that is active on a slot where CSI-RS resources corresponding to the CSI report are allocated.

15. The method of claim 12, wherein the second dynamic CB mapping type is the first dynamic CB mapping type that is active on a slot where a request for an aperiodic CSI report has been received.

16. The method of claim 11, wherein the first dynamic CB mapping type is indicated by a DCI.

17. The method of claim 16, wherein the second dynamic CB mapping type is the first dynamic CB mapping type that is used for a largest plurality of PDSCH slots for a time window up to and including a CSI reference resource slot.

18. The method of claim 16, wherein the second dynamic CB mapping type is the first dynamic CB mapping type that is used for a most recent PDSCH slot prior to and including a CSI reference resource slot.

19. The method of claim 16, wherein the second dynamic CB mapping type is configured for an identifier of the CSI report.

20. The method of claim 19, wherein a configuration of the second dynamic CB mapping type is carried in an RRC message for a periodic CSI report, in a MAC-CE for a semi-persistent CSI report, or a CSI-RS trigger state for an aperiodic CSI report.

21. An apparatus for wireless communication, comprising:
- a transceiver;
- a memory storing computer-executable instructions; and
- one or more processors coupled with the transceiver and the memory and configured to execute the computer-executable instructions to:
  - receive a physical downlink shared channel (PDSCH) based on a first dynamic code block (CB) mapping type in one or more slots;
  - receive a channel state information reference signal (CSI-RS);
  - calculate a channel quality indicator (CQI) and a rank indicator (RI) based on the CSI and a second dynamic CB mapping type; and
  - transmit a channel state information (CSI) report including the CQI and the RI.

22. The apparatus of claim 21, wherein the first dynamic CB mapping type is indicated by a MAC-CE.

23. The apparatus of claim 22, wherein the second dynamic CB mapping type is the first dynamic CB mapping type that is active in a CSI reference resource slot.

24. The apparatus of claim 22, wherein the second dynamic CB mapping type is the first dynamic CB mapping type that is active on a slot where CSI-RS resources corresponding to the CSI report are allocated.

25. The apparatus of claim 22, wherein the second dynamic CB mapping type is the first dynamic CB mapping type that is active on a slot where a request for an aperiodic CSI report has been received.

26. The apparatus of claim 21, wherein the first dynamic CB mapping type is indicated by a DCI.

27. The apparatus of claim 26, wherein the second dynamic CB mapping type is the first dynamic CB mapping type that is used for a largest plurality of PDSCH slots for a time window up to and including a CSI reference resource slot.

28. The apparatus of claim 26, wherein the second dynamic CB mapping type is the first dynamic CB mapping type that is used for a most recent PDSCH slot prior to and including a CSI reference resource slot.

29. The apparatus of claim 26, wherein the second dynamic CB mapping type is configured for an identifier of the CSI report.

30. An apparatus for wireless communication, comprising:
- a transceiver;
- a memory storing computer-executable instructions; and
- one or more processors coupled with the transceiver and the memory and configured to execute the computer-executable instructions to:
  - transmit a physical downlink shared channel (PDSCH) based on a first dynamic code block (CB) mapping type in one or more slots;
  - transmit a channel state information reference signal (CSI-RS); and
  - receive a channel state information (CSI) report including a channel quality indicator (CQI) and a rank indicator (RI), the CSI report based on the CSI-RS and a second dynamic CB mapping type.

* * * * *